US012771794B2

(12) United States Patent
Horiguchi

(10) Patent No.: US 12,771,794 B2
(45) Date of Patent: Oct. 20, 2026

(54) IMAGE READING DEVICE AND IMAGE FORMING APPARATUS THEREWITH

(71) Applicant: KYOCERA Document Solutions Inc., Osaka (JP)

(72) Inventor: Yasuyuki Horiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 157 days.

(21) Appl. No.: 19/008,207

(22) Filed: Jan. 2, 2025

(65) Prior Publication Data

US 2025/0227182 A1 Jul. 10, 2025

(30) Foreign Application Priority Data

Jan. 9, 2024 (JP) ................................. 2024-001256

(51) Int. Cl.
*H04N 1/00* (2006.01)
*G03G 15/22* (2006.01)
*H04N 1/203* (2006.01)

(52) U.S. Cl.
CPC ....... *H04N 1/00559* (2013.01); *G03G 15/228* (2013.01); *H04N 1/00591* (2013.01); *H04N 1/2034* (2013.01)

(58) Field of Classification Search
None
See application file for complete search history.

(56) References Cited

U.S. PATENT DOCUMENTS 11,431,864 B1 * 8/2022 Chang .................. H04N 1/1061
2005/0157319 A1 * 7/2005 Mizuhashi ........... H04N 1/4095 358/1.9
2006/0062615 A1 * 3/2006 Horio .................. G03G 15/607 399/374
2006/0175747 A1 * 8/2006 Boleda ..................... B65H 5/06 271/264
2008/0265489 A1 * 10/2008 Ng ..................... H04N 1/00591 271/226
2011/0096371 A1 * 4/2011 Mui ....................... H04N 1/484 358/474
2018/0113410 A1 * 4/2018 Mine ......................... B65H 7/20
2019/0208081 A1 * 7/2019 Horiguchi .............. H04N 1/407

FOREIGN PATENT DOCUMENTS

JP 2013-141079 A 7/2013
JP 2019-121824 A 7/2019
WO WO-2020214141 A1 * 10/2020 .......... H04N 1/2034

* cited by examiner

*Primary Examiner* — Jamie R Kucab
(74) *Attorney, Agent, or Firm* — Stein IP, LLC

(57) ABSTRACT

An image reading device includes a contact glass, an automatic document feeder, a first reading module, a second reading module, a white reference member, a swinging mechanism, one motor, and a control portion. The swinging mechanism swings the second reading module or white reference member in a direction orthogonal to the conveyance direction. The control portion, by rotating a motor forward, drives a conveying member to convey a document and, by rotating the motor reversely, drives the swinging mechanism with the conveying member at rest to swing the second reading module or white reference member and meanwhile acquire white reference data. When performing a duplex reading process successively for a plurality of sheets of a conveyed document, the control portion acquires the white reference data with the document at rest closely upstream of the second reading module in the conveyance direction.

6 Claims, 10 Drawing Sheets

IMAGE READING DEVICE AND IMAGE FORMING APPARATUS THEREWITH

INCORPORATION BY REFERENCE

This application is based on and claims the benefit of priority from Japanese Patent Application No. 2024-1256 filed on Jan. 9, 2024, the contents of which are hereby incorporated by reference.

BACKGROUND

The present disclosure relates to an image reading device for use in digital copiers, image scanners, and the like to scan and read a document, and relates to an image forming apparatus provided with such an image reading device.

Some known image reading devices for incorporation in multifunction peripherals and the like employing an electrophotographic process are provided with an automatic document feeder that feeds a document in the form of sheets sequentially into a document placement stage (contact glass) to read them and that then, after their reading, discharges them off the document placement stage. Such image reading devices are capable of two methods of reading: a sheet-through method in which, with a reading module fixed in an image reading position, a document is read while an automatic document feeder automatically conveys it; and a stationary-document method in which, each time a document is read, a document pressor is opened and closed to change from one sheet to another of the document on a document placement stage and a reading module is moved to scan and read the document placed on the document placement stage.

Today, the sheet-through method mentioned above is achieved typically by a simultaneous duplex reading method in which the front and back sides of a duplex document are read simultaneously by use of different reading modules respectively in a single document conveyance action by the automatic document feeder. The reading module for reading the back side of the document is disposed in the automatic document feeder. An image reading device requires various processes for initial setting, adjustment, and other operation for reading modules, and those processes include a white reference data acquisition process and a black reference data acquisition process whereby, as a light source incorporated in the reading module is lit and extinguished, the data of the amount of light reflected from a white reference plate disposed opposite the reading module is acquired as white reference data and black reference data.

SUMMARY

According to one aspect of the present disclosure, an image reading device includes: a contact glass, an automatic document feeder, a first reading module, a second reading module, a white reference member, a swinging mechanism, one motor, and a control portion. On the contact glass, a document is placed. The automatic document feeder is provided on the top face of the contact glass so as to be openable and closable with respect to it, and includes a conveying member that conveys the document to an automatic reading position on the contact glass. The first reading module is disposed below the contact glass so as to be reciprocable in the sub-scanning direction, and can read an image on the front side of a stationary document placed on the contact glass and of a conveyed document conveyed to the automatic-reading position by the automatic document feeder. The second reading module is disposed in the automatic document feeder, and can read an image on the back side of the conveyed document conveyed by the automatic document feeder. The white reference member is disposed opposite the second reading module. The swinging mechanism swings the second reading module or the white reference member in a direction horizontally orthogonal to the conveyance direction of the conveyed document. The motor drives the conveying member and the swinging mechanism. The control portion controls the second reading module, the swinging mechanism, and the motor. The second reading module includes a light source and a sensor that reads, as image light, the reflected light of the light shone from the light source to the conveyed document. The control portion rotates the motor forward and drives the conveying member to convey the document, and the control portion performs a white reference data acquisition process in which the control portion, by rotating the motor backward, while keeping the conveying member at rest, drives the swinging mechanism to swing the second reading module or the white reference member and meanwhile read, with the sensor, the reflected light of the light shone from the light source to the white reference member. As a conveying reading process for reading an image on the conveyed document, the control portion successively performs on a plurality of conveyed documents a duplex reading process whereby the images on the front and back sides of the conveyed document are read simultaneously and, when performing the white reference data acquisition process during an interval between the conveyed documents, the control portion acquires the white reference data with the conveyed document kept at rest closely upstream of the second reading module with respect to the conveyance direction.

DETAILED DESCRIPTION

Figure 1:
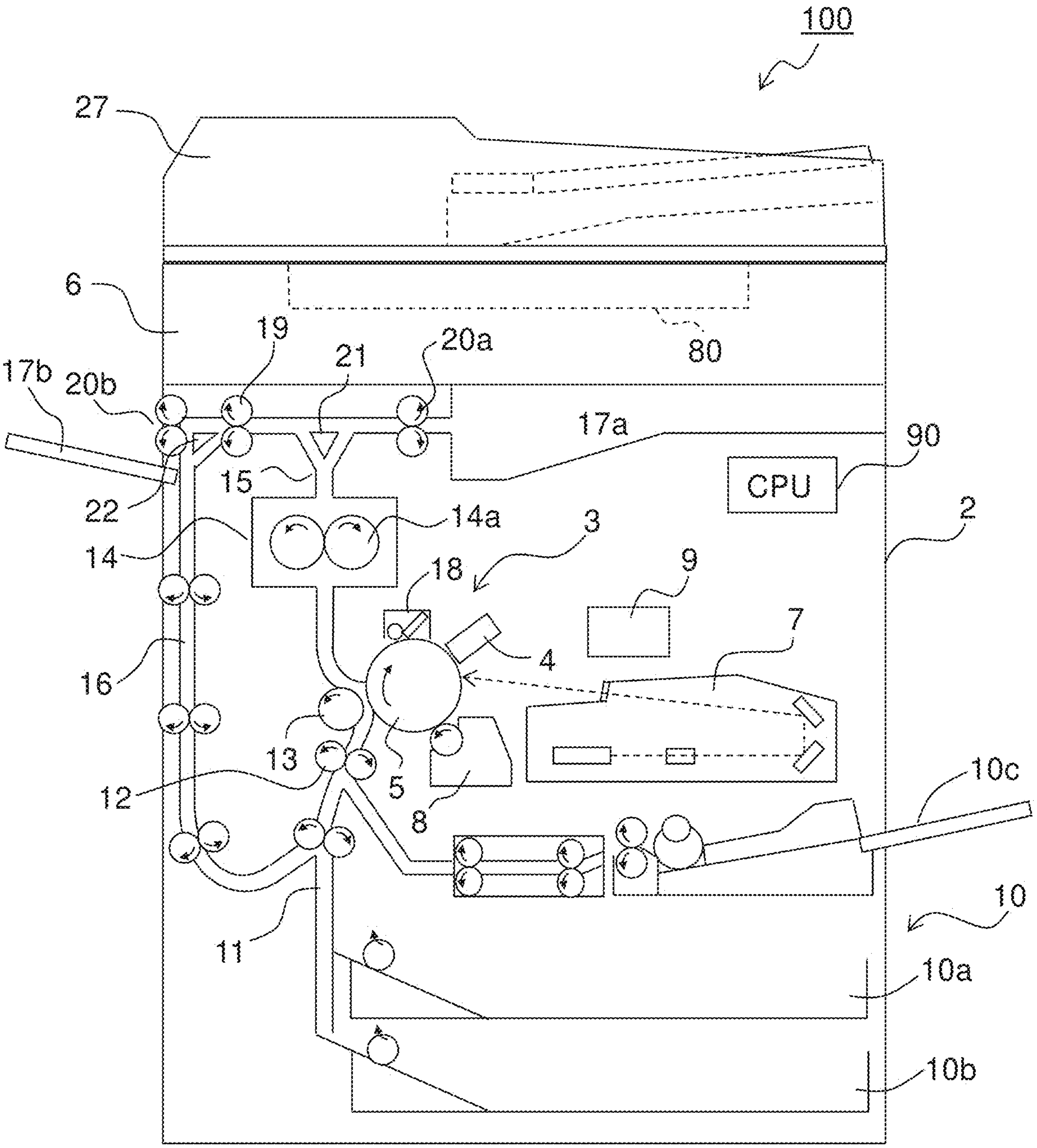
FIG. 1 is a side sectional view showing the overall construction of an image forming apparatus provided with an image reading portion according to the present disclosure.
Figure 5:
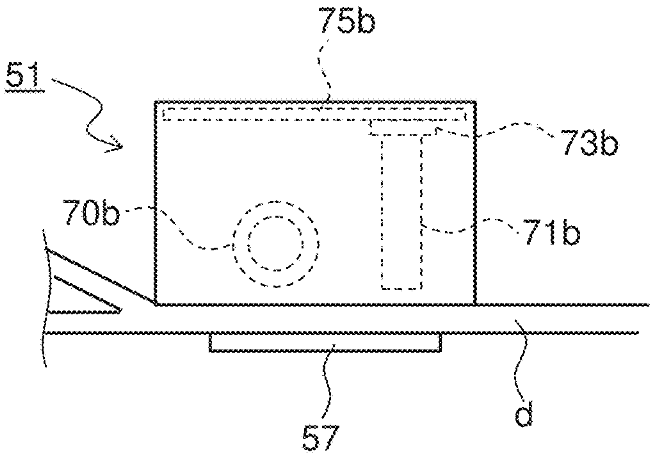
FIG. 5 is an enlarged view around a back-side reading module in FIG. 2.

An embodiment of the present disclosure will be described below with reference to the accompanying drawings. FIG. 1 is a schematic construction diagram of an image forming apparatus 100 provided with an image reading portion 6 according to the present disclosure. In FIG. 1, when copying operation is performed on the image forming apparatus 100 (here, a digital multifunction peripheral is taken as an example), the image data of a document is read and converted into a read image signal in an image reading portion 6, which will be described later. On the other hand, in an image forming portion 3 inside a multifunction peripheral body 2, a photosensitive drum 5, which rotates clockwise in FIG. 5, is electrostatically charged uniformly by a charging unit 4. Then, with a laser beam from an exposure unit (such as laser scanning unit) 7, an electrostatic latent image based on the document image data read by the image reading portion 6 is formed on the photosensitive drum 5. To the electrostatic latent image so formed, developer (hereinafter referred to as toner) is attached by a development unit 8 to form a toner image. The toner is supplied to the development unit 8 from a toner container 9.

To the photosensitive drum 5 having the toner image formed as described above, a sheet of paper is conveyed from a sheet feeding mechanism 10 via a sheet conveyance passage 11 and a pair of registration rollers 12 to the image forming portion 3. The conveyed sheet passes through the nip portion between the photosensitive drum 5 and a transfer roller 13 (image transfer portion) and meanwhile the toner image on the surface of the photosensitive drum 5 is transferred to the sheet. The sheet having the toner image transferred to it is separated from the photosensitive drum 5 and is conveyed to a fixing portion 14 having a pair of fixing rollers 14*a*, where the toner image is fixed. The sheet having passed through the fixing portion 14 is conveyed to a sheet conveyance passage 15 that branches into a plurality of directions. The sheet then has its conveyance direction switched by path switching mechanisms 21 and 22 having a plurality of path switching guides provided at branch points along the sheet conveyance passage 15, so as to be discharged as it is (or after being fed to a reversing conveyance passage 16 to be subjected to duplex copying) to a sheet discharge portion that includes a first discharge tray 17*a* and a second discharge tray 17*b*.

Though not shown, a static-eliminating device for eliminating residual electric charge on the surface of the photosensitive drum 5 is provided downstream of a cleaning device 18 with respect to the rotation direction of the photosensitive drum 5. A sheet feed mechanism 10 includes a plurality of sheet feed cassettes 10*a* and 10*b*, which are removably mounted in the multifunction peripheral body 2 and which store sheets, and a stack bypass (hand-feed tray) 10*c*, which is provided above them. These are all connected through a sheet conveyance passage 11 to the image forming portion 3, which includes the photosensitive drum 5, the development unit 8, and the like.

In an upper part of the multifunction peripheral body 2, the image reading portion 6 is disposed and, on the top face of the multifunction peripheral body 2, an automatic document feeder 27 is mounted. The bottom face of the automatic document feeder 27 serves also as a platen that, with the automatic document feeder 27 in a closed state, presses and holds a document placed on a contact glass 25 (see FIG. 2) on the image reading portion 6.

On the front face of the image reading portion 6, an operation portion 80 is provided. The operation portion 80 includes a liquid crystal display and LEDs to indicate the status of the image forming apparatus 100, the progress of image formation, and the number of copies printed. The operation portion 80 also includes a start button with which a user can enter an instruction to start image formation, a stop/clear button that the user can use, for example, to stop image formation, a reset button that the user can use to get the various settings on the image forming apparatus 100 back to the default ones.

Specifically, the sheet conveyance passage 15 first branches, downstream of the pair of fixing rollers 14*a*, into two, left and right, paths, of which one path (the one branching rightward in FIG. 1) communicates with the first discharge tray 17*a*. The other path (the path branching leftward in FIG. 1) runs through a pairs of conveyance rollers 19 and branches into two paths, of which one path (the path branching leftward in FIG. 1) communicates with the second discharge tray 17*b*. The other path (the path branching downward in FIG. 1) communicates with the reversing conveyance passage 16.

Inside the multifunction peripheral body 2, there is also disposed a control portion (CPU) 90 that controls the operation of the image forming portion 3, the image reading portion 6, the automatic document feeder 27, and the like.

Figure 2:
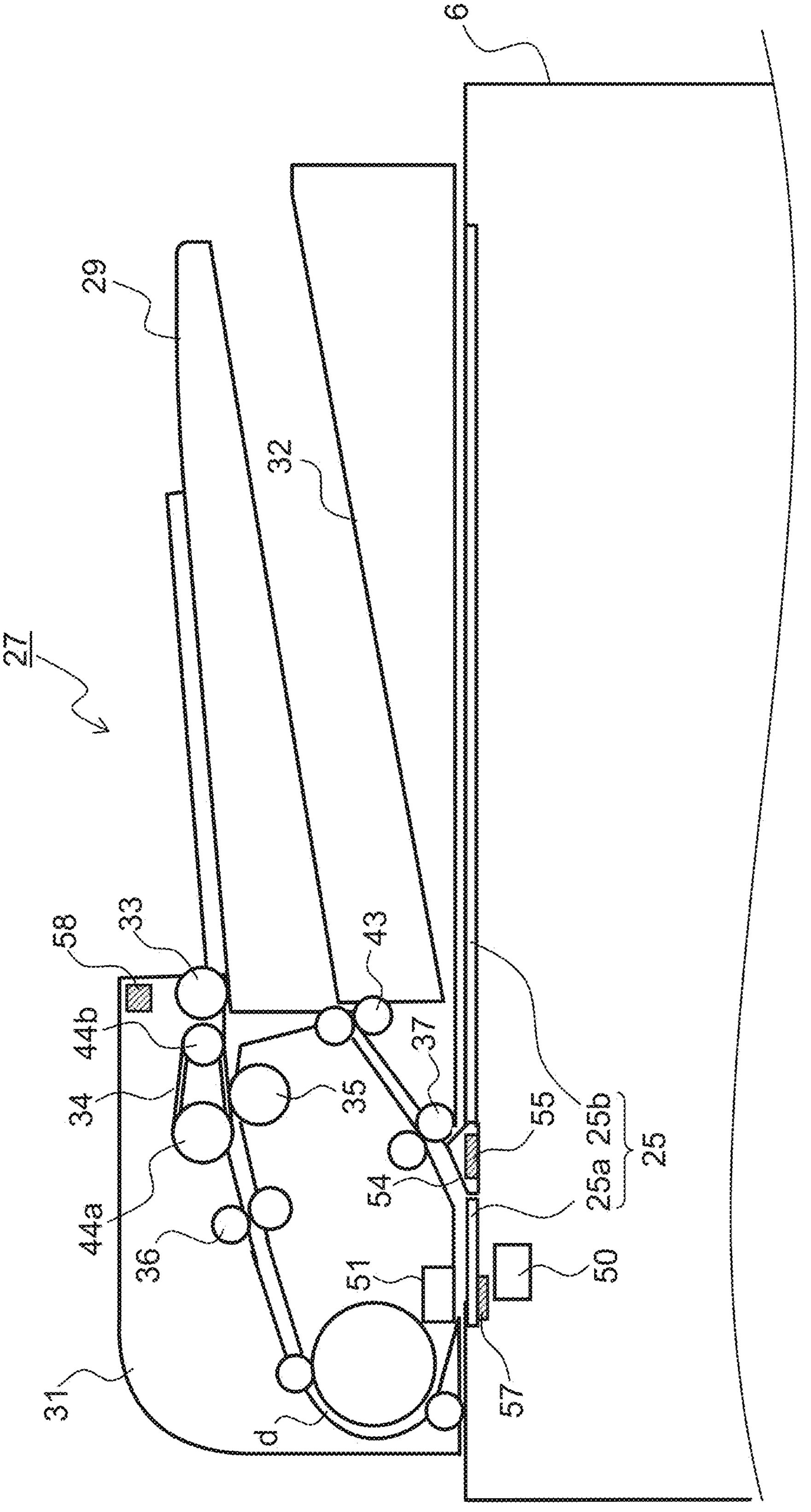
FIG. 2 is a side sectional view showing the internal structure of an image reading portion according to one embodiment of the present disclosure that is provided with an automatic document feeder.

FIG. 2 is a side sectional view showing the internal structure of an image reading portion 6 according to one embodiment of the present disclosure which is provided with an automatic document feeder 27. On the top face of the image reading portion 6, a contact glass 25 is disposed that comprises an automatic reading glass 25*a* and a hand-placed document glass 25*b*.

Inside the image reading portion 6, a front-side reading module 50 is disposed. The front-side reading module 50, while moving in the sub-scanning direction (left-right direction in FIG. 2), reads the image of a document placed on the hand-placed document glass 25*b*. In a state at rest immediately below the automatic reading glass 25*a*, the front-side reading module 50 reads the image on the front side (bottom side) of a document conveyed by the automatic document feeder 27.

Between the automatic reading glass 25*a* and the hand-placed document glass 25*b*, a conveyance guide 54 is disposed that lifts up the leading edge of the document conveyed by the automatic document feeder 27. Under the conveyance guide 54, a front-side white reference plate 55 is disposed for shading correction for the front-side reading module 50.

A cover member 31 of the automatic document feeder 27 is supported so as to be openable and closable with respect to the frame (not shown) of the automatic document feeder 27 about, as a fulcrum, the side (left side in FIG. 2) of the cover member 31 closer to a side face of the apparatus. Inside the cover member 31, there is formed a document conveyance passage d leading from a document feed tray 29 to a document discharge tray 32 and, along the document conveyance passage d, there are provided conveyance members, which include, a pickup roller 33, a sheet feed belt 34, a separation roller 35, a pair of registration rollers 36, a pair of conveyance rollers 37, a pair of discharge rollers 43, and the like, as well as a back-side reading module 51, which reads the image on the back side of the document.

The document conveyance passage d curves so as to turn back in a portion of it leading from the pair of registration rollers 36 to the automatic reading glass 25*a*. In the document conveyance passage d, at appropriate places along it, a plurality of sheet sensors (not shown) are provided that include a sheet feed sensor and a discharge sensor for sensing the presence or absence, or the passage, of the document. At a position opposite the back-side reading module 51 across the document conveyance passage d, a back-side white reference plate 57 is disposed for shading correction for the back-side reading module 51.

The sheet feed belt 34 is stretched around a driving roller 44*a* and a driven roller 44*b* and is contacted from below by the separation roller 35 with a predetermined pressure. The separation roller 35 incorporates a torque limiter so that it rotates by following the sheet feed belt 34 only when a rotation load is higher than a predetermined torque.

Inside the cover member 31, an open/close sensor 58 is disposed that senses whether the cover member 31 is open or closed. The open/close sensor 58 is a PI (photo-interrupter) sensor provided with a sensing portion having a light-emitting portion and a light-receiving portion. With the cover member 31 in a closed position as shown in FIG. 2, the open/close sensor 58 is shielded from light by a light-shield plate (not shown) provided on the cover member 31, so that the sensing portion yields a light reception signal with a low level. When from the state in FIG. 2 the cover member 31 pivots in the opening direction (upward), the light-shield plate retracts upward from the sensing portion of the open/close sensor 58, allowing the sensing portion to yield a light reception signal with a high level. The light reception signal of the open/close sensor 58 is transmitted to a control portion 90 (see FIG. 6), which thus senses whether the cover member 31 is open or close.

Next, a description will be given of document conveyance operation by a sheet-through method using the automatic document feeder 27. In the sheet-through method, with the automatic document feeder 27 in the closed state in contact with the contact glass 25, a plurality of document sheets are set on the document feed tray 29 with the image face up. After that, when a start button on the operation portion 80 (see FIG. 1) of the image forming apparatus 100 is turned on, a lift plate (not shown) raised by a lifting mechanism (not shown) pushes, via the document, the pickup roller 33 up. As a result, the weight of a frame member (not shown) including the pickup roller 33 acts on the lift plate, so that the top face of the document is pressed against the pickup roller 33 with a predetermined pressure (sheet feed pressure).

Here, the pickup roller 33, the driving roller 44*a*, the driven roller 44*b*, and the sheet feed belt 34 are disposed on the unshown frame member. The pickup roller 33 is coupled to the driving roller 44*a* by an unshown gear. As a roller drive motor (unshown) rotates the driving roller 44*a*, the sheet feed belt 34 stretched around the driving roller 44*a* and the driven roller 44*b* is driven to rotate and also the pickup roller 33 is driven to rotate.

Out of the document set on the document feed tray 29, typically a plurality of sheets in a top layer are fed by the pickup roller 33 to the nip portion between the sheet feed belt 34 and the separation roller 35. Then, of those document sheets, only the topmost sheet is separated and conveyed by the separation roller 35 toward the pair of registration rollers 36. Here, after the leading edge of the document is sensed by the sheet feed sensor, the document is conveyed over a predetermined distance; then, the roller drive motor stops being operated and thus the pickup roller 33 and the sheet feed belt 34 stop being driven to rotate, thus ending primary sheet feeding. The leading edge of the primarily fed document stays at rest, with a sag formed in it, at the nip portion between the pair of registration rollers 36.

A predetermined time after the completion of primary sheet feeding, secondary sheet feeding is started. Specifically, a secondary sheet feeding drive motor (unshown) operates to drive the pair of registration rollers 36 to rotate. The document is conveyed, by the pair of registration rollers 36 and the pair of conveyance rollers 37, toward the automatic reading glass 25*a*. The document conveyed to the automatic reading glass 25*a* makes contact with a document pressing member (unshown) disposed opposite the automatic reading glass 25*a* and is thereby pressed from above against the automatic reading glass 25*a*. The image on the front side (facing the automatic reading glass 25*a*) of the document is then read through the automatic reading glass 25*a* by the front-side reading module 50.

After that, the document having passed across the automatic reading glass 25*a* is conveyed via the conveyance guide 54 toward the pair of conveyance rollers 37 and the pair of discharge rollers 43, to be eventually be discharged by the pair of discharge rollers 43 onto the document discharge tray 32. Meanwhile, the discharge sensor senses the passage of the trailing edge of the document and thereby senses the completion of image reading for one document sheet. Here, the discharge sensor has a counting function to increment the number of document sheets every time the conveyance of a document sheet is complete and, if the sheet feed sensor has sensed a subsequent document sheet, the subsequent and following document sheets are conveyed in a similar manner as described above.

When a duplex document is read, the image on the back side of the document is read by the back-side reading module 51 provided upstream of the automatic reading glass 25*a* and then the image on the front side of the document is read by the front-side reading module 50.

Figure 3:
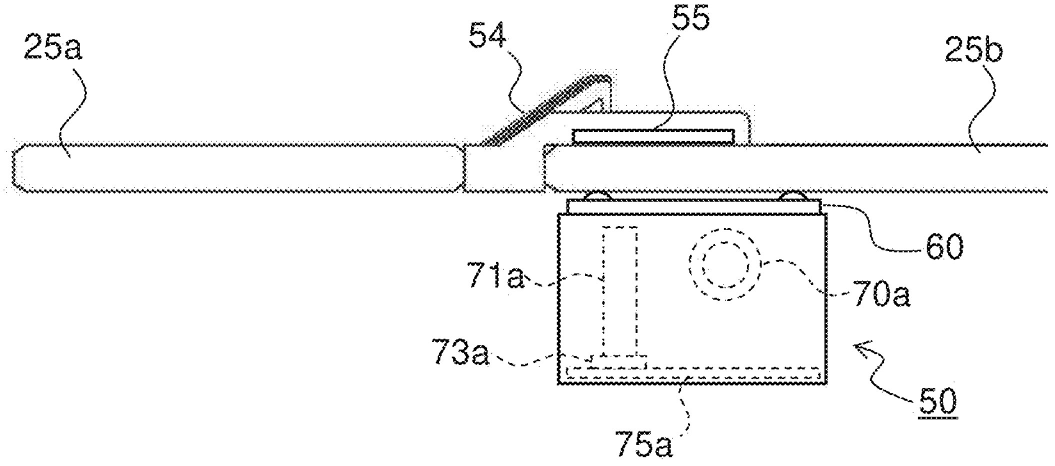
FIG. 3 is an enlarged view around a front-side reading module in FIG. 2, with the front-side reading module disposed at a reference position.
Figure 4:
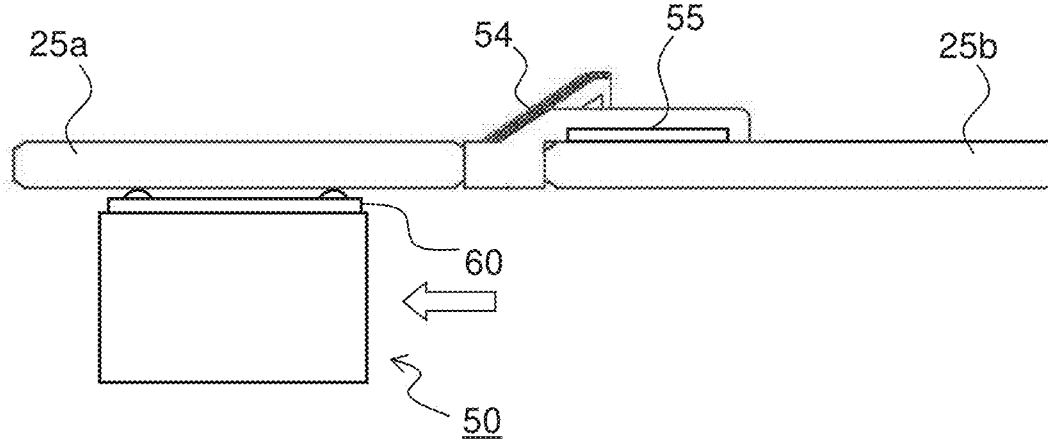
FIG. 4 is an enlarged view around the front-side reading module in FIG. 2, with the front-side reading module disposed at an automatic-reading position.

FIGS. 3 and 4 are enlarged views around the front-side reading module 50 and the front-side white reference plate 55 in FIG. 2, respectively showing a state where the front-side reading module 50 is at a reference position (home position) and a state where it is at an automatic-reading position. The front-side reading module 50 is a reading module of a CIS (contact image sensor) type.

As shown in FIG. 3, the front-side reading module 50 includes inside it a light source 70*a*, a light-collecting lens 71*a* composed of a plurality of lenses, and a CMOS (complementary MOS) sensor 73*a* as a reading means. The CMOS sensor 73*a* is supported on a substrate 75*a*. Light emitted from the light source 70*a* is reflected on the document (unshown) and is then collected by the light-collecting lens 71*a* to be directed to the CMOS sensor 73*a*. The front-side reading module 50 makes contact with the bottom face of the contact glass 25 via a slider 60.

Here, as an example of the reading method for the front-side reading module 50, a unit-magnification optical system is taken that does not use a mirror but uses a CMOS sensor 73 as an image sensor; instead, a reduction optical system can be used that uses a plurality of mirrors and optical lenses along with, as an image sensor, what is called a CCD (charge-couple device) and that reads an image by forming a reduced image of it with those optical lenses. In the above configuration, when a document image is read by the stationary-document method, first, the automatic document feeder 27 is opened and a document (not shown) is placed on the hand-placed document glass 25*b* with the front side down. Then the automatic document feeder 27 is closed and, while the image face of the document is irradiated with light from the light source 70*a*, the front-side reading module 50 is moved at a predetermined speed from the scanner home end (at left in FIG. 2) toward the scanner return end (at right in FIG. 2). As a result, the light reflected from the image face, which is image light, is focused on the CMOS sensor 73*a*. In the CMOS sensor 73*a*, the focused image light is resolved into pixels and converted into an electrical signal corresponding to the density at each pixel, thereby achieving image reading.

On the other hand, when a document image is read by the sheet-through method, with the automatic document feeder 27 closed, as shown in FIG. 4, the front-side reading module 50 is moved to an automatic reading position (immediately below the automatic reading glass 25*a*). Then the automatic document feeder 27 conveys the document one sheet after another toward the automatic reading glass 25*a* and, while the front face of the document passing across the automatic reading glass 25*a* is irradiated with light form the light source 70*a*, the image light reflected from the image face is focused on the CMOS sensor 73*a*, thereby achieving image reading. In either reading method, the image signal read by the front-side reading module 50 is converted into a digital signal and is then fed to a temporary storage 94 (see FIG. 6).

FIG. 5 is an enlarged view around the back-side reading module 51 in FIG. 2. The back-side reading module 51 is a reading module of a CIS (contact image sensor) type similar to the front-side reading module 50. As shown in FIG. 5, the back-side reading module 51 includes, inside it, a light source 70*b*, a light-collecting lens 71*b* composed of a plurality of lenses, and a CMOS (complementary MOS) sensor 73*b* as a reading means. The CMOS sensor 73*b* is supported on a substrate 75*b*.

The back side of the document passing across the back-side reading module 51 is irradiated with light from the light source 70*b*, and the reflected light (image light) reflected from the image face is collected by the light-collecting lens 71*b* and is focused on the CMOS sensor 73*b*. In the CMOS sensor 73*b*, the focused image light is resolved into pixels and converted into an electrical signal corresponding to the density at each pixel, thereby achieving image reading.

Figure 6:
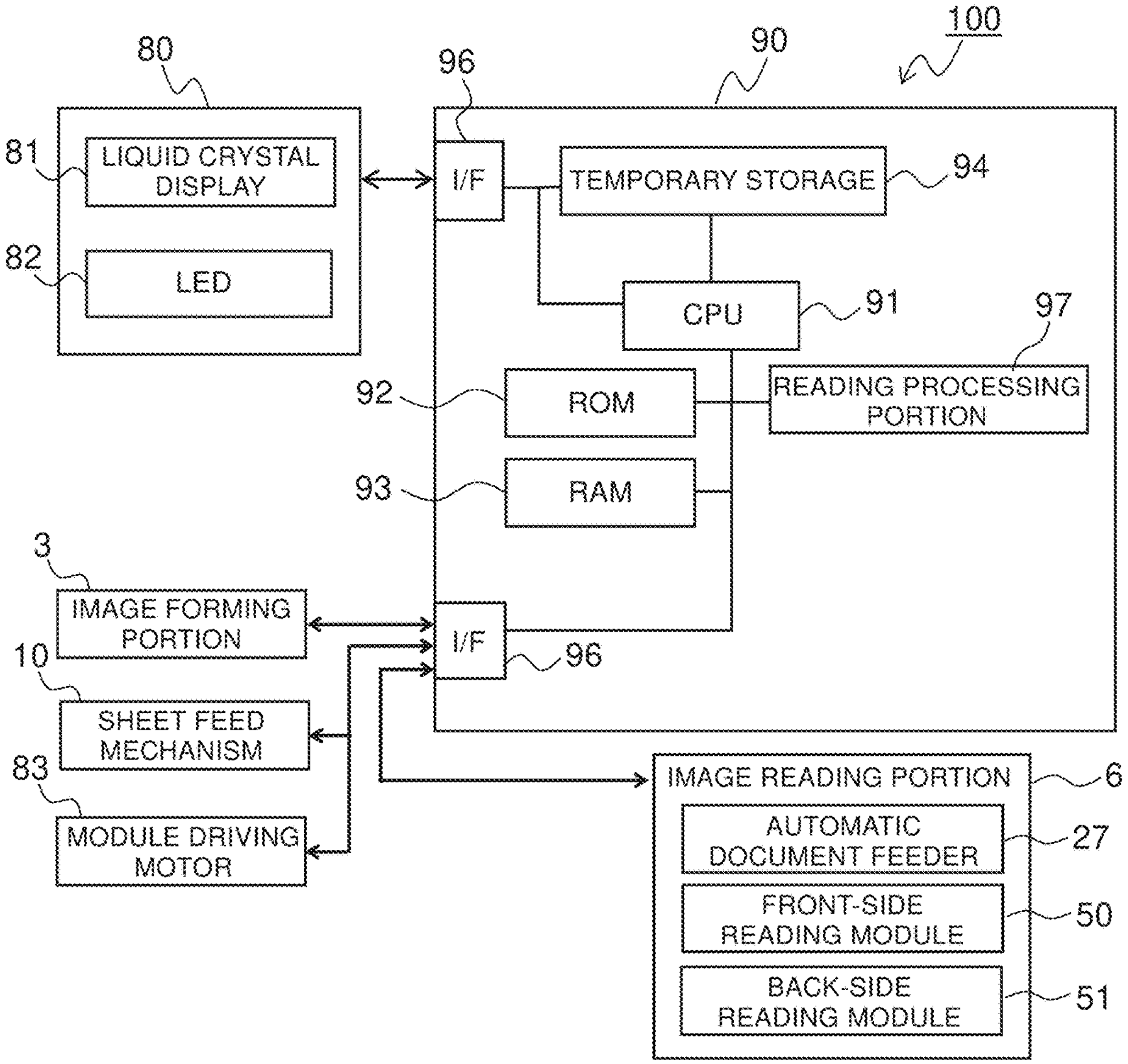
FIG. 6 is a block diagram showing one example of control paths used in the image forming apparatus according to the embodiment.

FIG. 6 is a block diagram showing one example of control paths used in the image forming apparatus 100 according to the embodiment. When the image forming apparatus 100 is in use, various kinds of control are performed for different parts of the image forming apparatus 100 and thus the control paths in the entire image forming apparatus 100 are complicated. For simplicity's sake, of those control paths, the following description focuses on only those which are necessary to implement the present disclosure.

The operation portion 80 includes a liquid crystal display 81 and LEDs 82 for indicating various states, and displays the status of the image forming apparatus 100, the progress of image formation, and the number of copies printed. Various settings for the image forming apparatus 100 are made from a printer driver on a personal computer.

The operation portion 80 also includes a start button with which a user can enter an instruction to start image formation, a stop/clear button that the user can use, for example, to stop image formation, a reset button that the user can use to get the various settings on the image forming apparatus 100 back to the default ones.

A module driving motor 83 makes the front-side reading module 50 reciprocate in the sub-scanning direction (left-right direction in FIG. 2) when a document image is read by the stationary-document method. The module driving motor 83 moves the front-side reading module 50 to the automatic-reading position when a document image is read by the sheet-through method. The module driving motor 83 is a stepping motor, and the control portion 90 can sense the position of the front-side reading module 50 according to the number of driving pulses for the module driving motor 83.

The control portion 90 includes at least a CPU (central processing unit) 91 as a central arithmetic processor, a ROM (read-only memory) 92 as a memory for reading only, a RAM (random-access memory) 93 as a readable/writable memory, a temporary memory 94 for temporarily storing image data and the like, a plurality of (here, two) I/Fs (interfaces) 96 for transmitting control signals to different devices in the image forming apparatus 100 and receiving input signals from the operation portion 80, and a reading processing portion 97. The control portion 90 can be disposed anywhere in the image forming apparatus 100.

The control portion 90 transmits control signals to different blocks and devices in the image forming apparatus 100 from the CPU 91 via the I/Fs 96. From those different blocks and devices, signals indicating their states, and also input signals, are transmitted via the I/Fs 96 to the CPU 91. The blocks and devices controlled by the control portion 90 include, for example, the image forming portion 3, the image reading portion 6, the automatic document feeder 27, and the operation portion 80.

The ROM 92 stores programs for the control of the image forming apparatus 100, data that are not changed during the use of the image forming apparatus 100, such as values needed for its control, and the like. The RAM 93 stores necessary data produced in the course of the control of the image forming apparatus 100, data temporarily needed for the control of the image forming apparatus 100, and the like. The temporary storage 94 temporarily stores an image signal that is fed in from an image input portion (not shown), which receives image data transmitted from the image reading portion 6, and that is then converted into a digital signal.

The reading processing portion 97 performs a stationary-document reading process (stationary reading process) in which it, using the front-side reading module 50, reads image data from a document placed on the hand-placed document glass 25*b*. The reading processing portion 97 also performs a sheet-through reading process (conveying reading process) in which it, using the front-side reading module 50 and the back-side reading module 51, reads the image data from the front and back sides of a document automatically conveyed by the document feed tray 29.

On various occasions as at power-on of the image forming apparatus 100, on its recovery from a power-saving state (sleep mode), in response to a predetermined change in temperature or humidity, or at the start of an image reading process, some processes are performed that are necessary for initial setting and adjustment of the front-side reading module 50 and the back-side reading module 51. Those processes include a white reference data acquisition process whereby, with the light source incorporated in the front-side reading module 50 or the back-side reading module 51 lit, white reference data is acquired from the front-side white reference plate 55 or the back-side white reference plate 57.

When the white reference data acquisition process is performed for the back-side reading module 51, while the back-side reading module 51 is swung, the light source 70*b* is lit so that the light emitted from the light source is reflected from the back-side white reference plate 57 and is then collected by the light-collecting lens 71*b* to be directed to the CMOS sensor 73*b*. Meanwhile the output voltage (output level) of the CMOS sensor 73*b* is acquired as light-amount data (white reference data).

More specifically, with the back-side white reference plate 57 swung, the output level of the CMOS sensor 73*b* is sensed a plurality of times to acquire a plurality of samples of light-amount data. Then, with an excessively low value (abnormal value) discarded, the average value of the usable samples of light-amount data is calculated. This helps reduce the influence of abnormal data ascribable to the variation of the surface condition of the back-side white reference plate 57.

Figure 7:
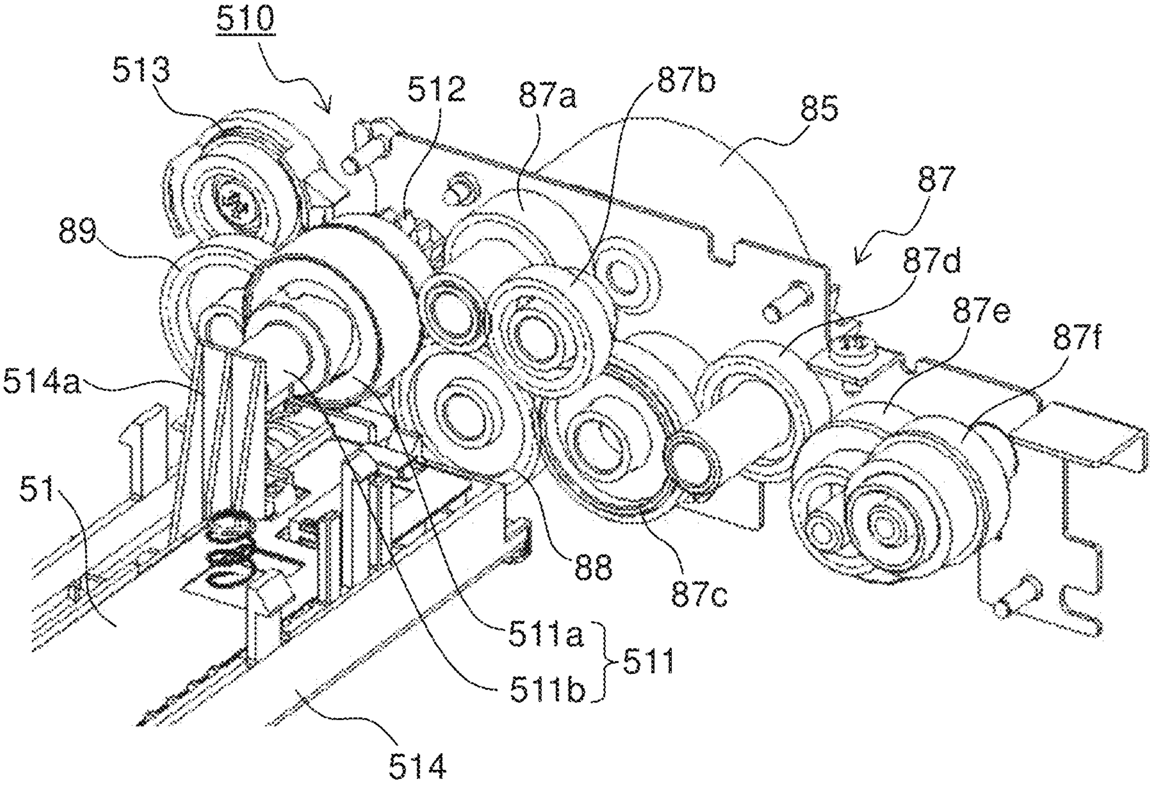
FIG. 7 is a perspective view showing the configuration around a swinging mechanism in the back-side reading module in the automatic document feeder according to the embodiment.
Figure 8:
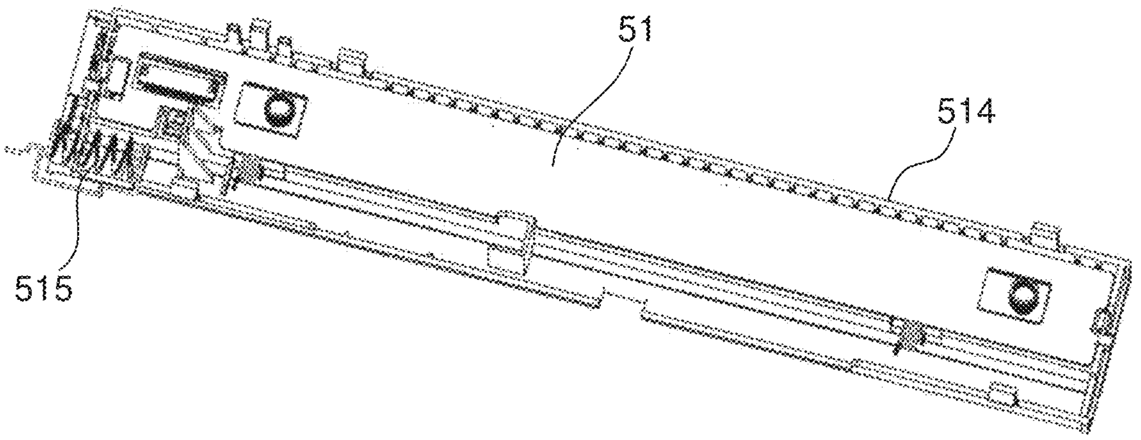
FIG. 8 is a perspective view of a module holding member that holds the back-side reading module.
Figure 9:
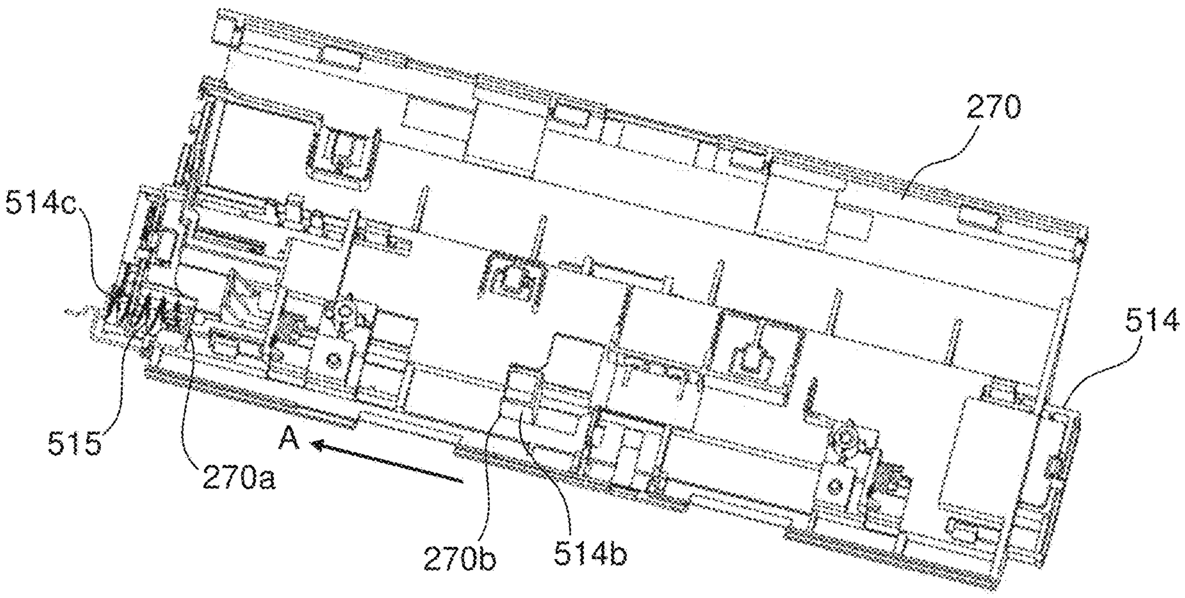
FIG. 9 is a perspective view of the module holding member fitted to a frame of the automatic document feeder.
Figure 10:
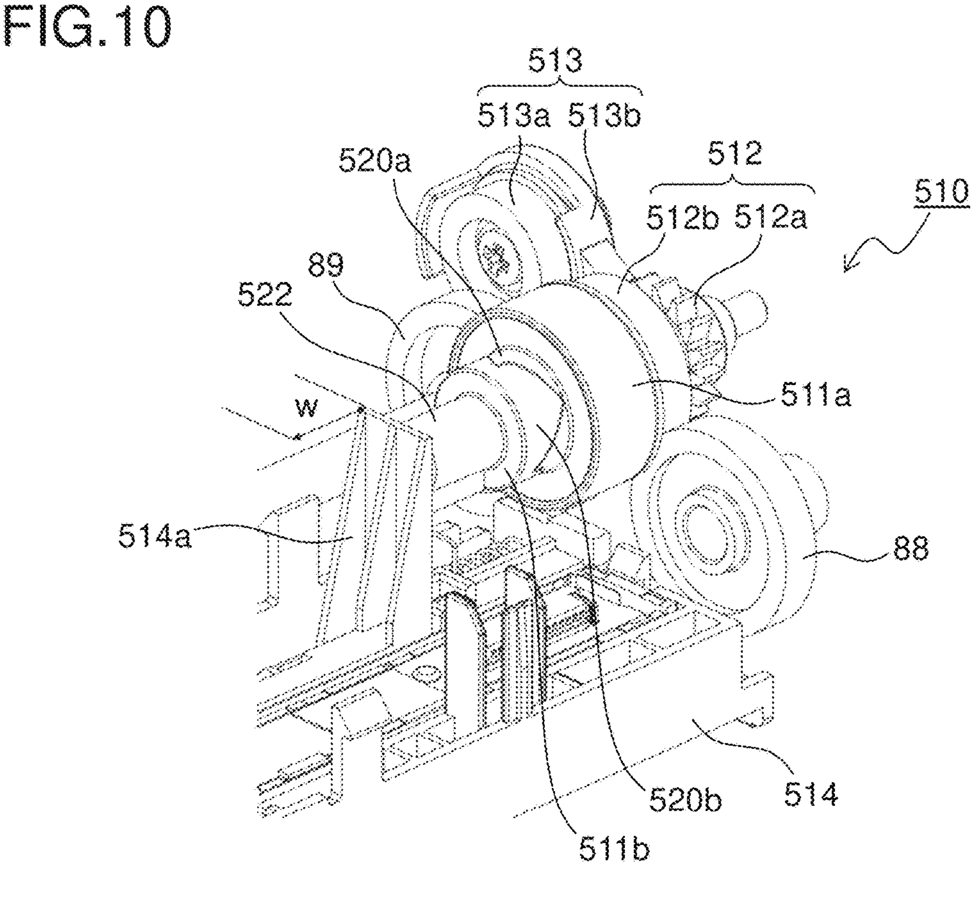
FIG. 10 is an enlarged view of the swinging member in FIG. 7.

FIG. 7 is a perspective view showing the configuration around a swinging mechanism 510 in the back-side reading module 51 in the image reading portion 6 according to the embodiment. FIG. 8 is a perspective view of a module holding member 514 included in the swinging mechanism 510. FIG. 9 is a perspective view showing the module holding member 514 fitted to a frame 270 of the automatic document feeder 27. FIG. 10 is an enlarged view of a swinging member 511 in FIG. 7. Now, the configuration and operation of the swinging mechanism 510 will be described in detail.

The swinging mechanism 510 includes a swinging member 511, a locked gear 512, a locking member 513, the module holding member 514, and a coil spring 515. The swinging mechanism 510, using a rotational driving force of a conveyance motor 85, swings the back-side reading module 51 in a direction (main scanning direction) horizontally orthogonal to the conveyance direction.

The conveyance motor 85 is coupled, via a pinion gear (not shown) fixed to the output shaft of the conveyance motor 85 and via a drive transmission gear train 87, to a conveying member comprising the pair of registration rollers 36, the pair of conveyance rollers 37, the pair of discharge rollers 43, and the like. The drive transmission gear train 87 includes a plurality of gears 87*a* to 87*f*. The rotational driving force of the conveyance motor 85 is transmitted to the gears 87*a* to 87*f* in this order.

The conveyance motor 85 is coupled, via the gears 87*a* to 87*c* in the drive transmission gear train 87, via a drive input gear 88, and via the locked gear 512, to the swinging member 511. More specifically, the rotational driving force of the conveyance motor 85 is transmitted from the pinion gear (not shown) fixed to the output shaft of the conveyance motor 85 to the gear 87*a*, the gear 87*b*, the gear 87*c*, the drive input gear 88, and the locked gear 512 in this order. That is, the conveying member and the swinging mechanism 510 are driven by a single conveyance motor 85.

Figure 11A:
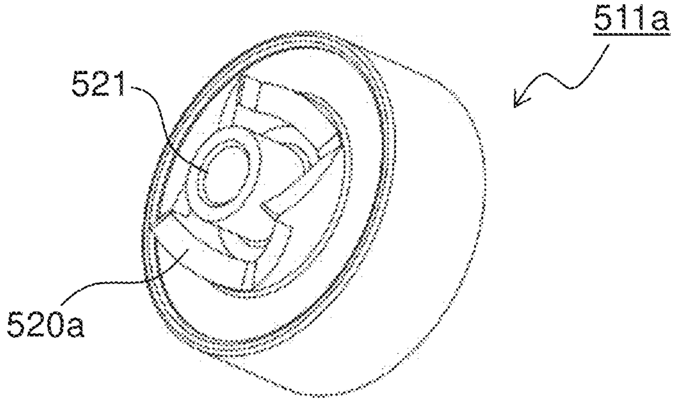
FIG. 11A is perspective view of a swinging member disassembled, showing a body portion.
Figure 11B:
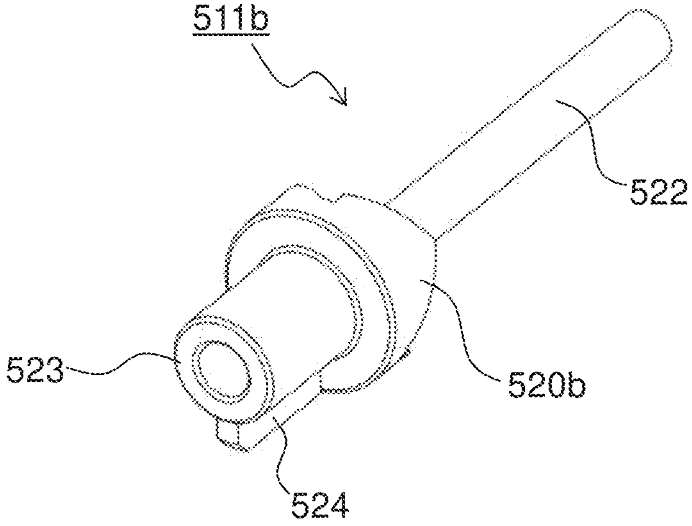
FIG. 11B is perspective view of the swinging member disassembled, showing a swinging portion.

FIGS. 11A and 11B are perspective views of the swinging member 511 disassembled. The swinging member 511 includes a body portion 511*a* and a swinging portion 511*b*. The swinging member 511 is disposed coaxially with the locked gear 512.

The body portion 511*a* has a first cam 520*a* and a first through hole 521. The first cam 520*a* meshes with a second cam 520*b* on the swinging portion 511*b*. The first through hole 521 is penetrated by a rotary shaft 525 (see FIG. 12A) of a sun gear portion 512*a*. The rotary shaft 525 rotatably holds the body portion 511*a*. The body portion 511*a* is in the shape of a hollow cylinder and has, formed on its inner circumferential surface, gear teeth (not shown) that mesh with the planetary gear 512*c* (see FIG. 12B).

The swinging portion 511*b* has a second cam 520*b*, a shaft 522, and a coupling portion 523. The shaft 522 is held so as to be movable in the axial direction by a bearing member (not shown) supported on the housing of the document conveyance device 27. The coupling portion 523 is supported on a guide portion 514*a* of the module holding member 514. On the outer circumferential surface of the coupling portion 523 is formed a rotation restricting portion 524 in the shape of a rib protruding in the radial direction. The rotation restricting portion 524 engages with an engaging portion (not shown) of the guide portion 514*a* to restrict the rotation of the swinging portion 511*b* about the shaft 522.

Figure 12A:
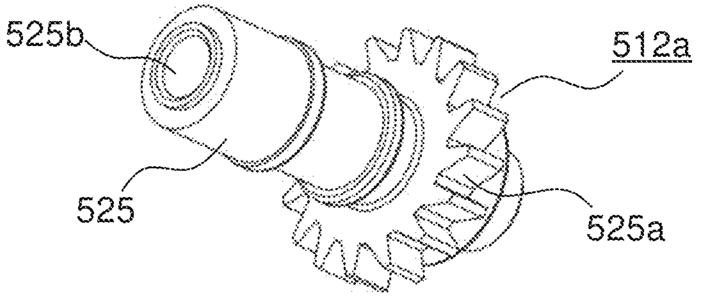
FIG. 12A is a perspective view of a locked gear, showing a sun gear portion.
Figure 12B:
FIG. 12B is a perspective view of the locked gear, showing a planetary gear portion.
Figure 12C:
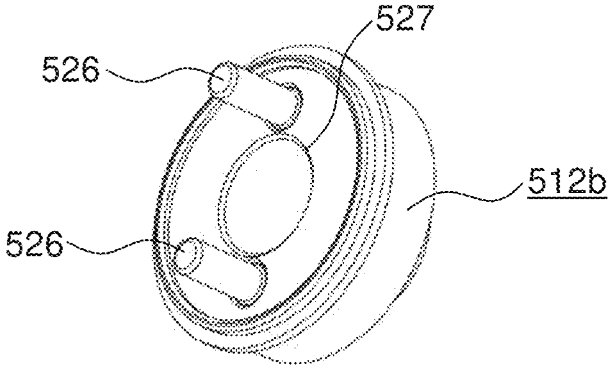
FIG. 12C is a perspective view of the locked gear, showing a planetary gear holding portion.

FIGS. 12A to 12C are perspective views of the locked gear 512 disassembled. The locked gear 512 has a sun gear portion 512*a* (FIG. 12A), a planetary gear holding portion 512*b* (FIG. 12C), and a planetary gear 512*c* (FIG. 12B).

The sun gear portion 512*a* has the rotary shaft 525. On the outer circumferential surface of the rotary shaft 525, at one side along it (at lower right in FIG. 12A), gear teeth 525*a* are formed that mesh with the locking member 513. On the outer circumferential surface of the rotary shaft 525, at the other side along it (at upper left in FIG. 12A), gear teeth (not shown) are formed that mesh with the planetary gear 512*c*. The rotary shaft 525 has a second through hole 525*b*. The second through hole 525*b* is penetrated by the shaft 522 of the swinging portion 511*b*. The shaft 522 rotatably holds the sun gear portion 512*a*.

The planetary gear holding portion 512*b* has a pair of shafts 526 and a third through hole 527. The shafts 526 rotatably support the planetary gear 512*c*. The third through hole 527 is penetrated by the rotary shaft 525 of the sun gear portion 512*a*. The rotary shaft 525 rotatably holds the planetary gear holding portion 512*b*. On the outer circumferential surface of the planetary gear holding portion 512*b*, gear teeth are formed that mesh with the drive input gear 88 and with conveyance gear 89.

The planetary gear 512*c* is disposed between the rotary shaft 525 of the sun gear portion 512*a* and the inner circumferential surface of the body portion 511*a*. The planetary gear 512*c* meshes with the gear teeth formed on the outer circumferential surface of the rotary shaft 525 and with the gear teeth formed on the inner circumferential surface of the body portion 511*a*.

The locking member 513 has a lock gear 513*a* and a lock claw 513*b*. The lock gear 513*a* is coupled, via the conveyance gear 89, to the planetary gear holding portion 512*b* of the locked gear 512. The conveyance gear 89 feeds a rotational driving force to a conveyance shaft and to a conveyance roller fixed to the conveyance shaft (neither is shown).

The lock claw 513*b* is swingable between a restricting position in which the lock claw 513*b* engages with the gear teeth 525*a* of the sun gear portion 512*a* to restrict the pivoting of the sun gear portion 512*a* and a retracted position in which the lock claw 513*b* stays away from the gear teeth 525*a*. As the lock gear 513*a* rotates, the lock claw 513*b* is disposed in either the restriction position or the retracted position. More specifically, when the conveyance motor 85 rotates forward, the lock claw 513*b* is disposed in the retracted position and, when the conveyance motor 85 rotates backward, the lock claw 513*b* is disposed in the restriction position.

The lock gear 513*a* incorporates a washer (not shown). The washer functions as the resistance (rotational load) of the lock gear 513*a* against the lock claw 513*b*.

The module holding member 514 holds the back-side reading module 51. The module holding member 514 is supported on the frame 270 (see FIG. 9) of the automatic document feeder 27 so as to be swingable in a direction orthogonal to the conveyance direction. The module holding member 514 has a guide portion 514*a* and a restricting projection 514*b*. The guide portion 514*a* supports the coupling portion 523 of the swinging portion 511*b*. The restricting projection 514*b* engages with an opening 270*b* of the frame 270 to restrict the movement of the module holding member 514 when this is pressed by the coil spring 515.

The coil spring 515 is disposed in one side part (left side part in FIG. 8) of the module holding member 514 along its longitudinal direction. As shown in FIG. 9, One end part of the coil spring 515 is fastened to a spring holding portion 514*c* of the module holding member 514. Another end part of the coil spring 515 abuts on a restricting portion 270*a* of the frame 270. Thus the module holding member 514 is kept in a state constantly pressed rearward (arrow A direction in FIG. 9) with respect to the automatic document feeder 27 by the drag that the module holding member 514 receives from the frame 270 in response to the urging force that the coil spring 515 exerts on the frame 270.

Next a description will be given of the relationship of the rotation direction of the conveyance motor 85 with the operation of the swinging mechanism 510. When a document is conveyed with the conveyance motor 85 rotated forward, the locking member 513 is disposed in the retracted position. Accordingly, the sun gear portion 512*a* of the locked gear 512 is not restrained from rotating.

As the conveyance motor 85 rotates forward, a rotational driving force is transmitted via the gears 87*a* to 87*c* to the drive input gear 88, and the drive input gear 88 rotates forward. As the drive input gear 88 rotates forward, the planetary gear holding portion 512*b* rotates. Here, with the first cam 520*a* meshed with the second cam 520*b* of the swinging portion 511*b*, the body portion 511*a* of the swinging member 511 is restrained from rotating. On the other hand, with the lock claw 513*b* disposed in the retracted position, the sun gear portion 512*a* of the locked gear 512 is not restrained from rotating.

Accordingly, the rotational driving force of the planetary gear holding portion 512*b* is transmitted via the planetary gear 512*c* to the sun gear portion 512*a*. That is, the sun gear portion 512*a*, the planetary gear holding portion 512*b*, and the planetary gear 512*c* rotate. On the other hand, the body portion 511*a* is not rotated by the rotational driving force of the planetary gear holding portion 512*b* but remains at rest.

As a result, the second cam 520*b* of the swinging portion 511*b* and the first cam 520*a* of the body portion 511*a* are kept meshed with each other. Accordingly, the module holding member 514 does not swing, leaving the document to be conveyed.

When the conveyance motor 85 is rotated backward, the lock claw 513*b* is disposed in the restriction position and thus the sun gear portion 512*a* is restrained from rotating. Accordingly, the rotational driving force of the planetary gear holding portion 512*b*, via the planetary gear 512*c*, tends to rotate the body portion 511*a*. As a result, the body portion 511*a* rotates starting in a state where the first cam 520*a* of the body portion 511*a* and the second cam 520*b* of the swinging portion 511*b* are meshed with each other. Thus, through alternation between the state where the first cam 520*a* of the body portion 511*a* and the second cam 520*b* of the swinging portion 511*b* are in mesh and the state where they are out of mesh, the swinging portion 511*b* swings along the axial direction.

When the first cam 520*a* and the second cam 520*b* are out of mesh, the module holding member 514, which is coupled to the swinging portion 511*b*, is pressed by the swinging portion 511*b* to move to one side while compressing the coil spring 515. When the first cam 520*a* and the second cam 520*b* are in mesh, the module holding member 514 moves to the other side under the urging force (restoring force) of the coil spring 515.

That is, the module holding member 514 swings in a direction orthogonal to the document conveyance direction. Thus, while the back-side reading module 51 is swung, white reference data can be acquired. This helps reduce the influence of soil and scratches on the back-side white reference plate 57. The swinging stroke w (see FIG. 10) of the module holding member 514 can be adjusted by adjusting the distance between the top land and the bottom land of the first and second cams 520*a* and 520*b*.

Figure 13:
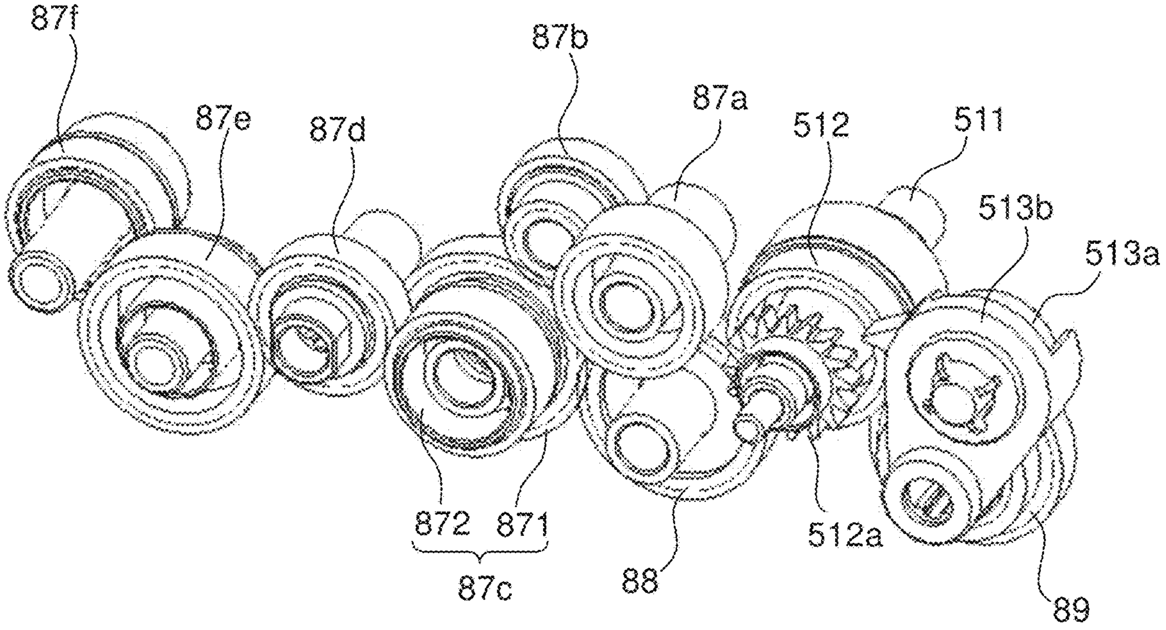
FIG. 13 is a perspective view of gears constituting a drive transmission gear train and the swinging mechanism.

FIG. 13 is a perspective view showing the gears constituting the drive transmission gear train 87 and the swinging mechanism 510. Note that FIG. 13, and also FIG. 14 referred to later, is a perspective view as seen from the far side of FIG. 7 and accordingly the arrangement of the gears there is reversed left to right as compared with that in FIG. 7. In the following description, the gear 87*c* to which the drive input gear 88 is coupled is referred to as the branch gear 87*c*.

As shown in FIG. 13, the branch gear 87*c* to which the drive input gear 88 is coupled is a two-stage gear composed of a first gear portion 871 and a second gear portion 872. The first gear portion 781 is meshed with the gear 87*b* and the drive input gear 88. The second gear portion 872 is meshed with the gear 87*b*.

Figure 14:
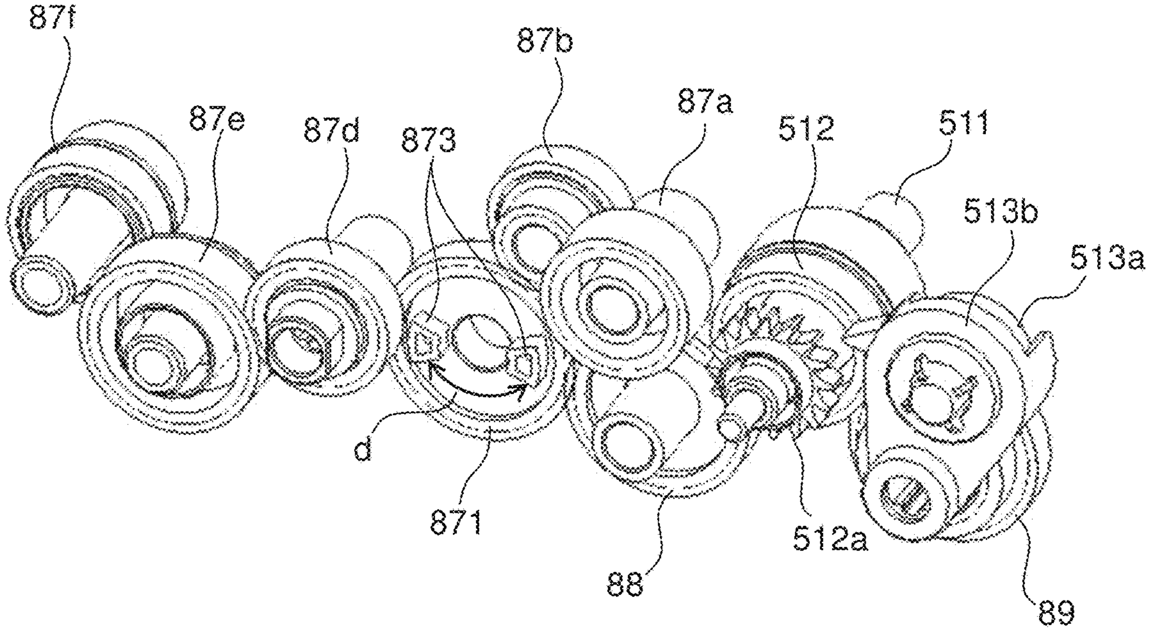
FIG. 14 is a perspective view of the gears constituting the drive transmission gear train the swinging mechanism, with a second gear portion of a gear removed.

FIG. 14 is a diagram showing the branch gear 87*c* in FIG. 13 with the second gear portion 872 removed. As shown in FIG. 14, on the surface of the first gear portion 871 facing the second gear portion 872, engagement protrusions 873 are formed. Two of the engagement protrusions 873 are formed at positions that are point-symmetric about the rotation center of the first gear portion 871.

Also on the surface of the second gear portion 872 facing the first gear portion 871, engagement protrusions (not shown) are formed. Like the engagement protrusions 873 on the first gear portion 871, two of the engagement protrusions on the second gear portion 872 are formed at positions that are point-symmetric about the rotation center of the second gear portion 872. In the state shown in FIG. 13 where the first and second gear portions 871 and 872 are combined together, the engagement protrusions on the second gear portion 872 are disposed between the engagement protrusions 873 on the first gear portion 871.

In the above structure, the first and second gear portions 871 and 872 are coupled together with a predetermined angle d of looseness (play). Thus, when the branch gear 87*c* switches from rotating forward to rotating backward, the first gear portion 871 first rotates backward through an angle d and then the second gear portion 872 starts to rotate backward. In other words, while the first gear portion 871 rotates backward through the angle d, the second gear portion 872 remains at rest.

That is, when the conveyance motor 85 rotates backward, during the period in which the branch gear 87*c* rotates through the angle d (i.e., idle rotation period), the gears 87*d* to 87*f* do not receive the rotational driving force of the conveyance motor 85. Thus, the document remains at rest inside the document conveyance passage d without moving in the direction opposite to the conveyance direction. While the document is at rest, the back-side reading module 51 is swung by the swinging mechanism 510 in a direction orthogonal to the conveyance direction, and thus white reference data is acquired once again for the back side.

With the above structure, rotating the conveyance motor 85 forward achieves the conveyance of the document, and rotating the conveyance motor 85 backward achieves the swinging of the back-side reading module 51 and thus the acquisition of white reference data. This eliminates the need for a motor dedicated to the swinging of the back-side reading module 51 and thus helps achieve cost reduction and space saving in the automatic document feeder 27.

Moreover, the configuration that permits, when the conveyance motor 85 is rotated backward, idle rotation between the first and second gear portions 871 and 872 of the branch gear 87*c* helps prevent the document from moving in the direction opposite to the conveyance direction. Thus, with the document held at rest immediately short of the back-side reading module 51, the back-side reading module 51 can be swung to acquire white reference data once again for the back side. It is thus possible to maintain an adequate image density without causing a drop in document reading efficiency (productivity) or scratches on the document resulting from its moving in the opposite direction.

Figure 15:
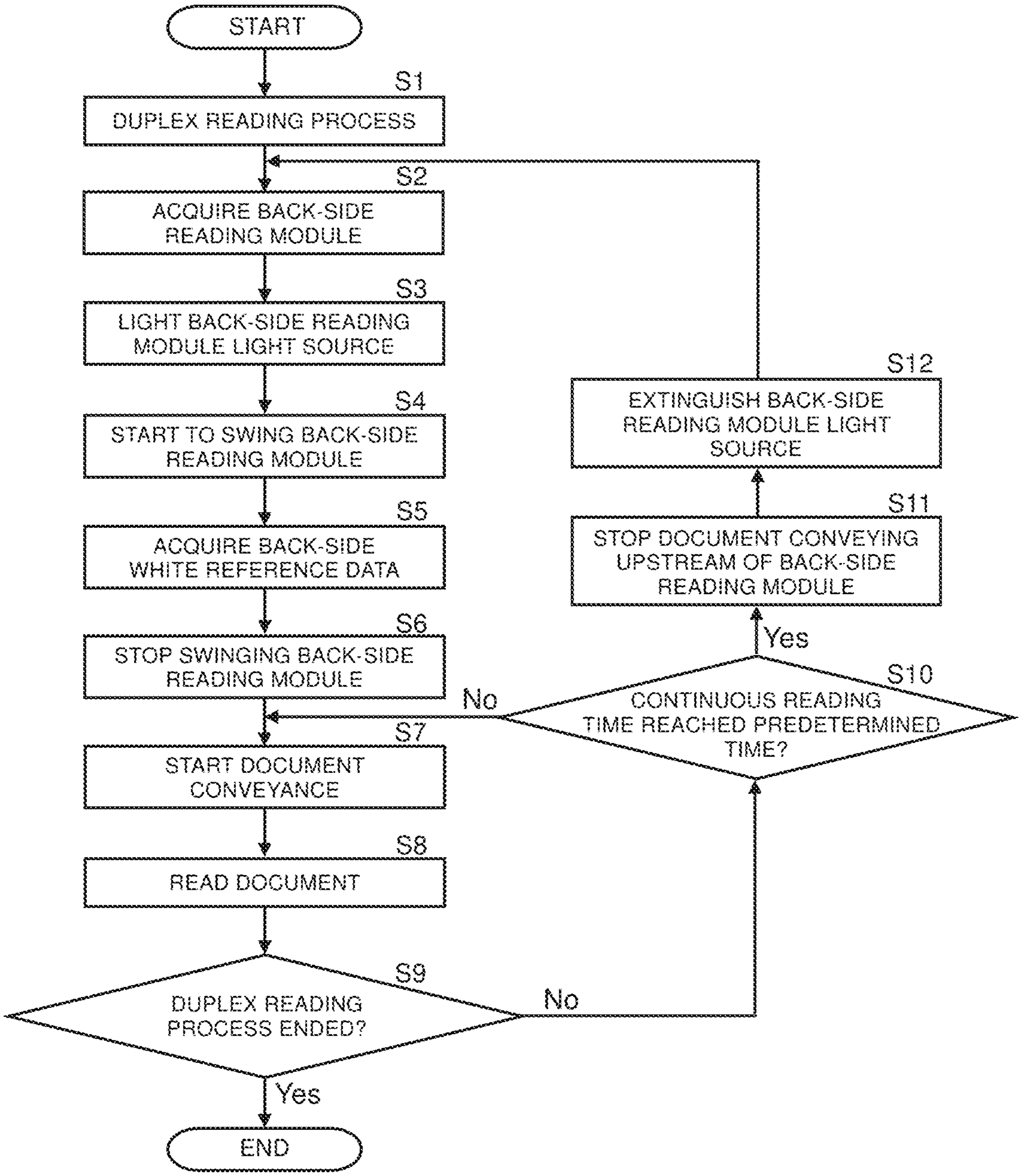
FIG. 15 is a flow chart showing an example of control for a back-side white reference data acquisition process by the back-side reading module in a duplex reading process.

FIG. 15 is a flow chart showing an example of control for the acquisition of back-side white reference data for the back-side reading module 51 in a duplex reading process. With reference also to FIGS. 1 to 14 as necessary, along the steps in FIG. 15, a procedure for acquiring back-side white reference data in the duplex reading process will be described.

When the duplex reading process is requested (Step S1), the control portion 90 acquires back-side black reference data (Step S2). Specifically, the output level of the CMOS sensor 73*b* with the light source 70*b* in the back-side reading module 51 extinguished is acquired as back-side black reference data.

Next, the control portion 90 lights the light source 70*b* in the back-side reading module 51 (Step S S3). Then, operating the swinging mechanism 510, the control portion 90 starts to swing the back-side reading module 51 (Step S4). Specifically, the conveyance motor 85 is rotated reversely through a predetermined angle to swing the back-side reading module 51 in a direction orthogonal to the conveyance direction such that it reciprocates one or more cycles.

While the back-side reading module 51 is swung, back-side white reference data is acquired (Step S5). Specifically, the output level of the CMOS sensor 73*b* with the light source 70*b* in the back-side reading module 51 lit is acquires as back-side white reference data. After the acquisition of back-side white reference data, the conveyance motor 85 stops being rotated and the back-side reading module 51 stops being swung (Step S6).

Next, the control portion 90 moves the front-side reading module 50 to immediately below the automatic reading glass 25*a* (reading position) and starts conveying the document (Step S7) to read the document (Step S8). The control portion 90 then checks whether a duplex reading process for a predetermined number of sheets has ended as requested (Step S9) and, if so (Step S9, Yes), it ends the process.

If the duplex reading process is still in progress (Step S9, No), the control portion 90 checks whether the continuous reading time has reached a predetermined time (Step S10). If the continuous reading time has not reached the predetermined time (Step S10, No), a return is made to Step S7 to continue the conveyance of the document and the duplex reading process (Steps S7 and S8).

If the continuous reading time has reached the predetermined time (Step S10, Yes), the control portion 90 stops the conveyance of the document upstream of the back-side reading module 51 (Step S11), and then extinguishes the light source 70*b* in the back-side reading module 51 (Step S12). A return is then made to Step S2, so that the control portion 90 acquires back-side black reference data, swings the back-side reading module 51 to acquire back-side white reference data, and restarts the conveyance of the document and the duplex reading process (Steps S2 to S8).

In the example of control shown in FIG. 15, when duplex reading is requested, preparations for image reading proceed by the following procedure: first, with the light source 70*b* in the back-side reading module 51 extinguished, back-side black reference data is acquired; then, with the light source 70*b* lit, the back-side reading module 51 starts to be swung to acquire back-side white reference data; and then the back-side reading module 51 stops being swung. After that, the conveyance of the document is started to read the document image.

After the first sheet of the document is read, in a continuous reading process, no black or white reference data is acquired and the conveyance and reading of the next sheet of the document continues. When the continuous reading time reaches the predetermined time, black and white reference data are acquired one again by the following procedure: the document is stopped closely upstream of the back-side reading module 51 and, with the light source 70*b* extinguished, black reference data is acquired; then, with the light source 70*b* lit again, the back-side reading module 51 starts to be swung to acquire white reference data; then the back-side reading module 51 stops being swung. After that, the conveyance and reading of the document is restarted.

As conditions that trigger the re-acquisition of black and white reference data during a continuous reading process, different reading times (number of sheets read) are set for different linear speeds (conveyance speeds) of the document under different reading conditions such as color reading, monochrome reading, and reading at different reading resolutions. For example, while in color reading three colors, R, G, and B, are read sequentially with a single CIS, in monochrome reading a single pass of reading suffices; thus the linear speed of the document is higher in monochrome reading. Accordingly, even with the same continuous reading time, the number of sheets read is greater in monochrome than in color reading. Moreover, the number of sheets read used as a triggering condition is set at a number of sheets that can be read in a predetermined time (e.g., two minutes).

In this way, it is possible to reduce the wait time for document conveyance and thereby suppress a drop in reading efficiency. It is also possible to suppress damage to the document resulting from its being conveyed reversely. In image density correction after a restart of reading, it is possible, by use of the re-acquired black and white reference data, to effectively eliminate variation and unevenness of image density.

The present disclosure is not limited by the embodiment described above and allows for any modifications without departure from the spirit of the present disclosure. For example, while the above embodiment deals with a configuration where the swinging mechanism 510 swings the back-side reading module 51 in a direction orthogonal to the conveyance direction, a configuration is also possible where the swinging mechanism 510 moves, instead of the back-side reading module 51, the back-side white reference plate 57 in a direction orthogonal to the conveyance direction. The back-side white reference plate 57 can be swung with a mechanism similar to the swinging mechanism 510 according to the embodiment.

While in the above embodiment the mechanism for switching the back-side reading module 51 between a swung state and a stationary state as the conveyance motor 85 rotates forward and backward is implemented with a locked gear 512 provided with a planetary gear mechanism having a sun gear portion 512*a*, a planetary gear holding portion 512*b*, and a planetary gear 512*c*, instead of this planetary gear mechanism any configuration can be used to switch the back-side reading module 51 between a swung state and a stationary state as the conveyance motor 85 rotates forward and backward. Such other configurations include one that uses a one-way gear that transmits a driving force to the swinging member 511 only when the conveyance motor 85 rotates reversely.

While the above embodiment deals with, as an example of an image reading device, one composed of an image reading portion 6 and an automatic document feeder 27 and including a front-side reading module 50 disposed in the photosensitive drum 5 and a back-side reading module 51 disposed in the automatic document feeder 27, the present disclosure is quite equally applicable to an image scanner that includes two reading modules corresponding to the front-side reading module 50 and the back-side reading module 51 described above and that is used as a unit separate from an image forming apparatus 100.

The present disclosure finds application in image reading devices provided with a reading module disposed within an automatic document feeder. Based on the present disclosure, it is possible to provide an image reading device that can acquire white reference data appropriately while suppressing a drop in reading efficiency and damage to a document during duplex continuous reading, and to provide an image forming apparatus provided with such an image reading device.

What is claimed is:

1. An image reading device comprising:

a contact glass on which a document is placed;

an automatic document feeder provided on a top face of the contact glass so as to be openable and closable with respect thereto, the automatic document feeder including a conveying member that conveys the document to an automatic reading position on the contact glass;

a first reading module disposed below the contact glass so as to be reciprocable in a sub-scanning direction, the first reading module being operable to read an image on a front side of a stationary document placed on the contact glass and a conveyed document conveyed to the automatic reading position by the automatic document feeder;

a second reading module disposed in the automatic document feeder, the second reading module being operable to read an image on a back side of the conveyed document conveyed by the automatic document feeder;

a white reference member disposed opposite the second reading module;

a swinging mechanism that swings the second reading module or the white reference member in a direction horizontally orthogonal to a conveyance direction of the conveyed document;

one motor that drives the conveying member and the swinging mechanism; and a control portion that controls the second reading module, the swinging mechanism, and the motor, wherein the second reading module includes:

a light source; and a sensor that reads, as image light, reflected light of light shone from the light source to the conveyed document, the control portion rotates the motor forward and drives the conveying member to convey the document, and the control portion performs a white reference data acquisition process in which the control portion, by rotating the motor backward, while keeping the conveying member at rest, drives the swinging mechanism to swing the second reading module or the white reference member and meanwhile read, with the sensor, the reflected light of the light shone from the light source to the white reference member, and as a conveying reading process for reading an image on the conveyed document, the control portion successively performs on a plurality of the conveyed documents a duplex reading process whereby the images on the front and back sides of the conveyed document are read simultaneously and, when performing the white reference data acquisition process during an interval between the conveyed documents, the control portion acquires the white reference data with the conveyed document kept at rest closely upstream of the second reading module with respect to the conveyance direction.

2. The image reading device according to claim 1, wherein the conveying member is coupled to the motor via a drive transmission gear train including a plurality of gears, the swinging mechanism is coupled to the motor via a locked gear coupled to a branch gear which is one of the gears included in the drive transmission gear train, the branch gear has:

a first gear portion coupled to the gear upstream of the branch gear in the drive transmission gear train with respect to the drive transmission direction and coupled also to the locked gear; and a second gear portion coupled to the gear downstream of the branch gear in the drive transmission gear train with respect to the drive transmission direction, and the second gear portion rotates idly after the motor starts to rotate reversely until the first gear portion rotates through a predetermined angle.

3. The image reading device according to claim 2, wherein the swinging mechanism has:

a swinging member disposed coaxially with the locked gear, the swinging member having a body portion and a swinging portion each having serrate gear teeth formed on a sliding surface thereof;

a locking member that, when the motor rotates forward, stays away from the locked gear to permit the locked gear to rotate and that, when the motor rotates backward, engages with the locked gear to prevent the locked gear from rotating;

a holding member reciprocable in the swinging direction, the holding member holding the second reading module or the white reference member; and an urging member that urges the holding member to one side in the swinging direction, when the motor rotates forward and the locked gear rotates, the body portion does not rotate and, when the motor rotates backward and the locking member prevents the locked gear from rotating, the body portion rotates, the swinging portion is non-rotatable but movable in an axial direction, the swinging portion being disposed to contact the holding member from a side thereof opposite from the urging member; and rotating the motor reversely causes the body portion to rotate to make the gear teeth slide relative to each other so that the swinging portion reciprocates in the axial direction to swing the holding member.

4. The image reading device according to claim 2, wherein while the second gear portion of the branch gear is rotating idly, the swinging mechanism swings the second reading module or the white reference member such that it reciprocates one or more cycles.

5. The image reading device according to claim 1, wherein the control portion starts the white reference data acquisition process when the motor starts to rotate reversely, and ends the white reference data acquisition process before the motor stops rotating reversely.

6. An image forming apparatus comprising the image reading device according to claim 1.

* * * * *